Dec. 3, 1968                   C. CALMON                 3,414,507
METHOD FOR TREATING HIGH HARDNESS WATER HAVING MAJOR
AMOUNTS OF SODIUM THEREIN
Filed Aug. 30, 1965
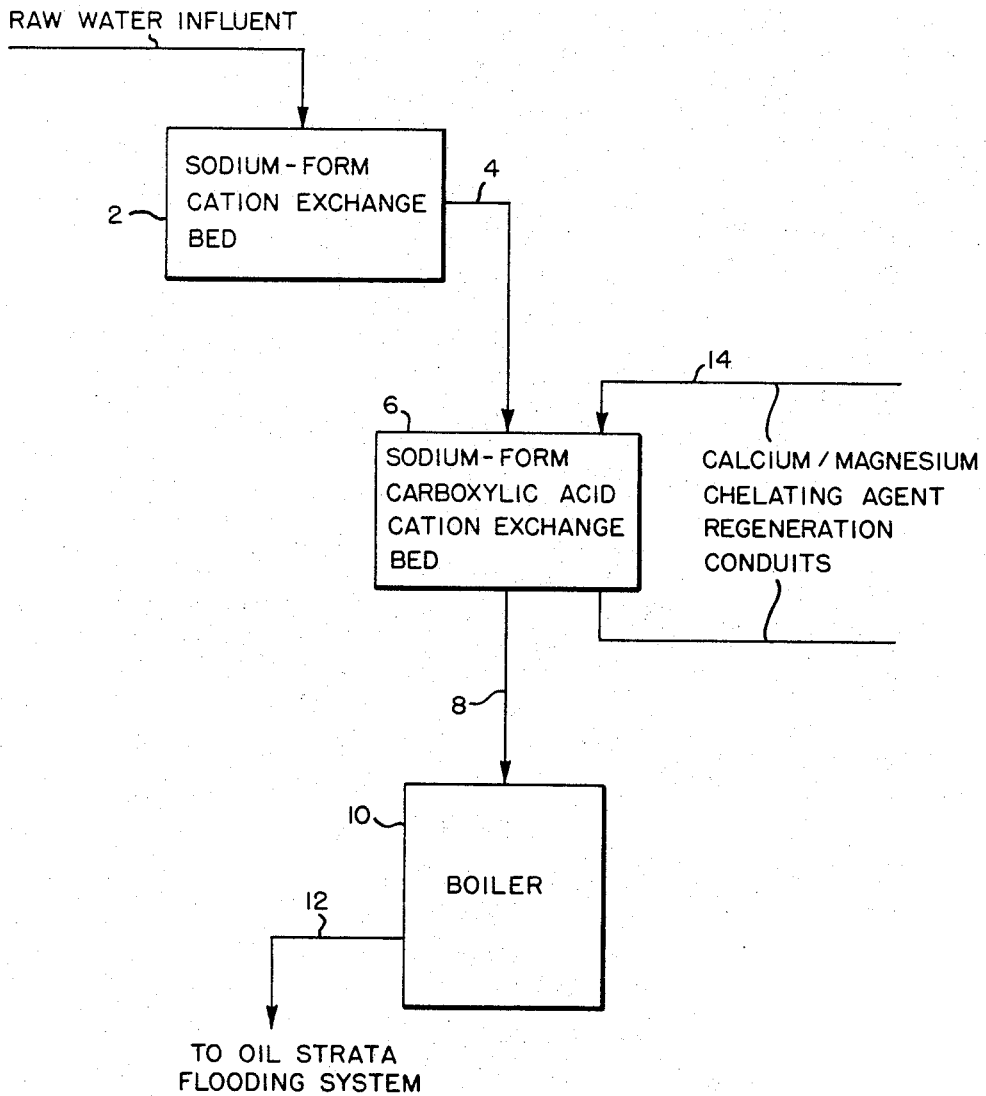
INVENTOR.
CALVIN CALMON
BY
ATTORNEY

United States Patent Office 3,414,507
Patented Dec. 3, 1968

3,414,507
METHOD FOR TREATING HIGH HARDNESS WATER HAVING MAJOR AMOUNTS OF SODIUM THEREIN
Calvin Calmon, Springfield Township, Burlington County, N.J., assignor to Ritter Pfaudler Corporation, a corporation of New York
Filed Aug. 30, 1965, Ser. No. 483,612
7 Claims. (Cl. 210—32)

ABSTRACT OF THE DISCLOSURE

A process of softening water which comprises: pretreating the same with a strong cation exchanger to reduce the hardness to less than 30 p.p.m.; and then removing the remaining hardness by treatment with carboxylic acid cation exchanger. The exchanger is periodically regenerated by a chelating agent or a strong inorganic acid.

---

This invention relates generally to water treatment and more particularly relates to methods of pre-treating aqueous solutions that are to be used in crude oil recovery processes incorporating oil strata flooding recovery techniques.

Recently various secondary recovery techniques have been developed to recover residual oil from oil-bearing formations after the natural pressures have been exhausted. Among the secondary recovery methods are the flooding techniques wherein a driving or flooding fluid is used either to drive residual crude oil to a producing well or to displace the crude oil with flooding fluids, thus forcing the crude oil to the surface.

A further development in water-flooding techniques is the addition of additives to the flood waters thereby increasing the efficiency of the recovery process. Such a process is illustrated by U.S. Patent No. 3,160,205 issued to Harvey et al. on Dec. 8, 1964.

Because of the large volumes of water required in such operations, it is desirable to utilize waters immediately surrounding the well site. However, these waters generally contain large amounts of electrolytes, predominantly sodium ions and chloride ions, but including magnesium and calcium among others. It is not uncommon to find waters with a total electrolyte content as high as 100,000 p.p.m. (calculated as calcium bicarbonate) at well sites. The following table sets forth analyses of water found at typical drilling sites in the Coalinga, California area.

TABLE

Sample 1

| Anions: | P.p.m.[1] |
|---|---|
| Bicarbonate | 212 |
| Chloride | 316 |
| Sulfate | 2750 |

| Cations: | P.p.m.[1] |
|---|---|
| Calcium | 292 |
| Magnesium | 188 |
| Sodium | 3150 |

Sample 2

| Anions: | P.p.m.[1] |
|---|---|
| Bicarbonate | 324 |
| Chloride | 302 |
| Sulfate | 2320 |

| Cations: | P.p.m.[1] |
|---|---|
| Calcium | 295 |
| Magnesium | 210 |
| Sodium | 2450 |

Sample 3

| Anions: | P.p.m.[1] |
|---|---|
| Bicarbonate | 180 |
| Chloride | 290 |
| Sulfate | 2940 |

| Cations: | P.p.m.[1] |
|---|---|
| Calcium | 222 |
| Magnesium | 98 |
| Sodium | 3090 |

[1] The analysis of the electrolyte content of the water is given in terms of parts per million of calcium carbonate. Discrepancies in the total anion and cation count are attributable to analytical errors.

In oil recovery processes using flooding techniques large volumes of water are cycled through such equipment as boilers, viaducts, pumping lines, etc. Water containing high calcium and magnesium hardness, typified by the three samples cited above, will form deposits on the walls of such equipment. Further complicating this basic problem is the fact that many of the additives used in such operations tend to react with calcium and magnesium to form insoluble precipitates, thus depleting the effective additive concentration and clogging both the apparatus and the oil-bearing strata. These deposits increase maintenance costs, necessitate frequent repair and replacement and generally decrease the efficiency of the entire operation. Costly chemical compositions which necessitate a discontinuance of oil recovery operations, are available for partial removal of various hardness deposits. In contrast, pretreatment of the water supply to completely remove the calcium and magnesium cations which form the deposits eliminates the development of all the problems pertaining to calcium and magnesium deposits. Accordingly, the primary object of this invention is to provide an improved method for the complete removel of calcium and magnesium ions from water to be used in such techniques.

Generally speaking, the prior art practice is to pass the raw high-solids content water through a conventional sodium-form cation exchange material such as strong-acid-sulfonated cross-linked polystyrene cation exchange resin in the sodium form to reduce the hardness content of the raw water. All or a portion of the partially softened water is then passed through a boiler system. The resulting steam is either used directly or ad-mixed with the unheated treated raw water, which results in softened hot water, to flood the oil bearing strata. However, considerable difficulties are encountered in the water softening steps. In the presence of high sodium ion concentration or high hardness the conventional sodium-form cation exchange material leaks hardness (calcium and magnesium) depending upon the initial hardness and sodium concentrations. Although residual hardness is tolerable for other applications, in the case of equipment used for flooding oil wells with water in which large quantities of water are used and high temperatures are involved, even traces of hardness create excessive scale deposit on equipment. Since it is most difficult and expensive to remove the scale deposits from the equipment, it is not economically feasible to permit a level of hardness which causes such scale deposits to remain in flooding oil well water. It is therefore another object of this invention to provide a method whereby magnesium and calcium ions may be completely removed from water containing substantial amounts of sodium ions.

In the prior art processes there is another inherent feature which reduces their economic attractiveness. The solids content of the liquid phase within the boiler system increases as steam is made. In cases where the boiler influent hardness content is high, greater than 1 p.p.m., a greater portion of the treated water will not be available for steam production. This is so because when the concentrations of solids approach their maximum solubility point in the boiler systems, the salts will precipitate out. It is therefore necessary to remove the heated, but non-vaporized water from the boiler prior to the saturation point of the electrolytes. This results in a considerable waste of heat. Obviously, the greater the amount of hardness in the water entering the boiler system, the smaller will be the ratio of steam produced to water heated. It is yet another object of this invention to provide a method for pretreating waters for use in said flooding recovery systems wherein the hardness is reduced to a level of zero so that substantially all of the water introduced into the boiler may be used without a recycle to eliminate precipitated salts.

Briefly stated, I have found a method for reducing the calcium and magnesium content of partially softened effluent water from existing sodium-form cation exchange units, which may contain between about 1–30 p.p.m. of hardness, depending on the cation content of the water, to a substantially zero level. In my proposed method said partially softened water is passed through a bed of cation exchange material having carboxylic acid groups in the sodium or hydrogen form as the active part of said material. The form of the carboxylic resin will depend on the presence or absence of bicarbonate ion in the influent water. It has been found that carboxylic acid ion exchange materials in the sodium form will effectively and preferentially exchange sodium for calcium and magnesium in the presence of large amounts of sodium in the water to be treated. As a result, water passing through the said carboxylic material will be completely devoid of the hardness which was present previous to such treatment. However, for economic reasons said carboxylic material, when exhausted to the calcium or magnesium form, must be regenerated.

Usually regeneration of carboxylic acid resins in the calcium and magnesium salt forms to the sodium form is carried out by a first treatment with an acid followed by treatment with caustic soda. The reactions may be represented by the following equations wherein CR represents a carboxylic ion exchange resin:

Softening:

$$Ca^{++} + 2Na\text{-Carboxylic Resin}(CR) \rightarrow Ca(CR)_2 + 2Na^+$$
$$Mg^{++} + 2Na(CR) \rightarrow Mg(CR)_2 + 2Na^+$$

Regeneration:

(a) $Ca(CR)_2 + 2H^+(\text{acid}) \rightarrow 2H(CR) + Ca^{++}$
$Mg(CR)_2 + 2H^+ \rightarrow 2H(CR) + Mg^{++}$ (b) $H(CR) + NaOH \rightarrow Na(CR) + H_2O$ Thus, we note that the usual regeneration requires two steps, acid followed by caustic. Such a process is necessarily time-consuming and expensive requiring not only the initial contact with acid and subsequent treatment with caustic but also several intermediate rinses to remove residual acid and caustic. It is therefore another object of this invention to provide a one-step method for regeneration of carboxylic acid cation exchange material in the calcium or magnesium form.

I have found that this object may be attained by either the use of a chelating agent which preferentially will complex with calcium and magnesium or by the use of an acid in the presence of water containing an amount of bicarbonate equal to or greater than the hardness content. The use of chelating compounds which reduces the regeneration to one step may be shown by the following equations:

$$Ca(CR)_2 + 2NaChelate \rightarrow 2NaCR + Ca(chelate)_2$$
$$Mg(CR)_2 + 2NaChelate \rightarrow 2NaCR + Mg(chelate)_2$$

Since the removal of hardness by the carboxylic resin is confined to a low concentration of calcium and magnesium, the cost of chelating regenerant per unit of water treated is low. There are also procedures for recovering the chelating agent through conversion of the complexed molecules containing the calcium and magnesium back to the sodium.

Due to the fact that many waters contain bicarbonate, the regeneration of the carboxylic acid resin in such water can be accomplished in only one step by the use of an acid as long as the hardness content is not greater than the bicarbonate content. This is illustrated by the following equations:

Softening:

$$2Na(CR) + Ca^{++} \rightarrow Ca(CR)_2 + 2Na^+$$
$$2Na(CR) + Mg^{++} \rightarrow Mg(CR)_2 + 2Na^+$$

Regeneration:

$$Ca(CR)_2 + 2H^+ \rightarrow 2H(CR) + Ca^{++}$$
$$Mg(CR)_2 + 2H^+ \rightarrow 2H(CR) + Mg^{++}$$

Softening with Water Containing Alkalinity:

$$H(CR) + NaHCO_3 \rightarrow Na(CR) + H_2O + CO_2$$

The bicarbonate neutralizes the hydrogen on the carboxylic resin and converts it to the sodium form which softens the water to zero hardness. Thus, no expensive chelating compounds are needed, but only acid is required as the sodium bicarbonate acts as a neutralizer for the hydrogen and as a source of sodium for the carboxylic acid resin.

Referring to the accompanying drawing, raw water, which may contain solids as set forth in the table above, is introduced into a conventional sodium-form cation exchange bed 2. The effluent, partially softened to about 1–30 p.p.m. calcium and magnesium is then passed through conduit 4 into sodium-form carboxylic acid cation exchange bed 6. In bed 6 the residual hardness is removed by an exchange of the calcium and magnesium, for the sodium in the ion exchange material and a completely hardness-free water passes therefrom. This water passes through pipe 8 into boiler 10, where it is heated to form steam. The steam then proceeds through outlet passage 12 into the oil strata flooding system. Various auxiliary equipment, such as pumps, valves, meters, etc. are within the skill of the art and are not shown in the drawing.

When sodium-form carboxylic acid cation exchange material bed 6 has been exhausted to the point where hardness leakage into pipe 8 is no longer tolerable, the flow through conduit 4 is diverted by suitable means (not shown) from the exhausted sodium-form carboxylic acid cation exchange material bed 6. By-pass line 14 carries the calcium/magnesium chelating regeneration agent or acid through the exhausted bed 6 until regeneration is effected. At that time the flow through conduit 4 into bed 6 is resumed.

It is obvious that minor changes can be made in the process, for example the regeneration of sodium-form cation exchange material bed 2 can be effected with the appropriate sodium ion and partial deflection of the effluent of boiler 10.

The following specific examples will further illustrate the practice of this invention.

Example 1

A sample of water, simulating in hardness water taken from an oil well site (containing approximately 285 p.p.m. Ca, 143 p.p.m. Mg, 6 p.p.m. Na, 115 p.p.m. $HCO_3$, 305 p.p.m. Cl, and 12 p.p.m. $SO_4$) was passed through a sulfonated copolymer polystyrene cation exchange resin in the sodium form at a rate of 50 ml./min. until the resin was exhausted. The action of this ion exchange resin resulted in effluent water containing 2 p.p.m. of hardness. The sodium ion content of the water was adjusted to about 1,000 p.p.m. to simulate the high sodium content of water used for flooding oil wells and used in Step II below.

Step II.—100 ml. of a sodium form carboxylic acid cation exchange material was placed in a 5/8 inch diameter plastic tube equipped with a screen at the lower end for retaining the resin and for controlling the flow of liquid through the column. The carboxylic cation exchange material was a cross-linked copolymer of acrylic and methacrylic acid with divinylbenzene. Divinylbenzene crosslinking was in the range of 2–20% of the acid component. Water containing 2 p.p.m. of hardness with a sodium content of about 1,000 p.p.m. was passed through the sodium carboxylic acid resin at a rate of 50 ml./min.

Periodic analysis of the effluent water indicated that an equivalent of 2,208 liters of water containing 2.0 p.p.m. hardness (calculated as $CaCO_3$) passed through the column prior to a breakthrough of hardness in the effluent. The 2,208 liters of effluent water had been softened to a level of zero (0) p.p.m. (as measured by the Schwarzenbach method for determining hardness) before exhaustion of the ion exchange material was evidenced by a leakage of the hardness.

Step III.—After exhaustion of the bed, as evidenced by the breakthrough of hardness as described above, 1,000 ml. of a 5% sodium citrate dihydrate solution was passed through the exhausted bed at a rate of 5 ml./min. Continual analysis of the spent regenerant from this phase indicated the point at which most of the hardness had been removed from the resin. This step resulted in regeneration of the exhausted bed by reconverting the material therein from the calcium and magnesium form to the sodium form.

Example 2

100 ml. of a spent carboxylic acid cation exchange resin in the calcium and magnesium forms which had been used as in Step II of Example I to reduce the hardness of 2,200 liters of influent water from 2 p.p.m. to zero p.p.m., was treated with approximately 300 ml. of 1–2% sulfuric acid by passing the acid through the exhausted bed at a rate of about 5–15 ml./min. This converted the calcium and magnesium form of the carboxylic acid cation exchange resin to the hydrogen form.

Water with a bicarbonate content of 150 p.p.m., a hardness of 2 p.p.m. and containing about 1,000 p.p.m. of sodium was then passed through the hydrogen form of the carboxylic resin bed. The hydrogen form of the ion exchange resin was converted to the sodium form which reduced the hardness of 2,100 liters of the influent water to a level of zero p.p.m. (as measured by the standard Schwarzenbach method for hardness determination). The spent carboxylic resin was regenerated again with the above dosage of sulfuric acid.

Although the invention has been described in terms of specific materials, the inventive concept is not limited thereto.

The cation exchange material that is to be used for the initial partial softening step may be a conventional softening material such as the generally recognized strong-acid type cation exchangers in the sodium form. Among the suitable materials are cross-linked polystyrene resins (10% divinylbenzene) which have been sulfonated and treated with a sodium containing material to convert the resin to the sodium form. Other suitable materials are those obtained by sulfonating and converting to sodium forms, monovinyl- and polyvinyl aromatic compounds (other than styrene and divinylbenzene) such as nuclear methylated styrene and divinylbenzene; chlorostyrene and divinylbenzene; styrene, ethylvinylbenzene, and divinylbenzene; etc. Such ion exchange materials are well known in the art.

The second cation exchange material that is used to completely reduce the level of hardness to zero p.p.m. in the presence of sodium, is a carboxylic acid cation exchange material. For example, cross-linked copolymers of acrylic or methacrylic acids and divinylbenzene, or condensation products of aromatic or paraffinic carboxylic compounds and formaldehyde wherein the principle active groups are carboxylic acids in the sodium form, are deemed full equivalents. The exhausted carboxylic cation exchange resin may be regenerated to the sodium form in the presence of bicarbonate-containing water with any of the strong acids such as sulfuric acid, hydrochloric acid and nitric acid.

The following are examples of regenerating chelating agents which will preferentially complex with calcium and/or magnesium. These are used in regeneration of the exhausted carboxylic acid cation exchange material which is substantially in the calcium and magnesium forms. The chelating agents are the sodium salts of these acids: citric acid, analine-N,N-diacetic acid; 2-aminobenzoic acid, N, N'-diacetic acid; -aminoethylphosphonic acid, N,N-diacetic acid; -aminoethylsulfonic acid, N,N-diacetic acid; ammoniatriacetic acid; anilinediacetic acid; 2-sulfoaniline-diacetic acid; 1,4 - diaminocyclohexane-, N,N' - tetracetic acid; ethylenediamine tetraacetic acid; methylamine-N,N-diacetic acid; trimethylenediamine tetraacetic acid; tetramethylenediamine tetraacetic acid; pentamethylenediamine tetraacetic acid; gluconic acid; malic acid; and pyruvic acid.

Of course, if desired, regenerating chelating agents specific for calcium may be used followed by chelating agents specific for magnesium or vice versa in place of one agent specific for both ions.

The described well-site waters contained sodium in concentrations as high as 3150 p.p.m. However, we have found that sodium contents considerably less than this cause hardness leakage in conventional commercial grade cation exchangers. For example, in water having an initial hardness content of 150 p.p.m., an increase in sodium salts from 0–850 p.p.m. resulted in a 20% decrease in the exchange capacity of a typical conventional sodium form cation exchanger. The approximate lower threshold for this effect is at about 100 p.p.m. of sodium. Accordingly, the terms major amounts of sodium or substantial amounts of sodium refer to water having a sodium content of about 100 p.p.m. or more.

By hardness I intend to be understood as meaning the calcium and/or magnesium ion content in the aqueous solution. By softened water I intend to be understood as meaning an aqueous solution from which all or substantially all of the hardness has been removed.

Changes and modifications to suit specific applications will be apparent to those skilled in the art. Accordingly, the foregoing disclosure is illustrative rather than limiting, and the invention is to be limited only by the scope of the claims appended hereto.

What is claimed is:

1. A method of softening hard water containing at least 100 p.p.m. sodium and at least 30 p.p.m. hardness comprising the following steps:
    (a) pre-treating said hard water with a strong acid cation exchange material to reduce the hardness content to less than 30 p.p.m.;
    (b) passing said partially softened water through a carboxylic acid cation exchange material to completely remove hardness therefrom; and
    (c) periodically contacting said carboxylic acid cation exchange material with a regenerating agent selected from the group consisting of calcium chelating agents, magnesium chelating agents, and mixtures of calcium and magnesium chelating agents.

2. A method according to claim 1 wherein said pre-treatment is effected with a sodium form cation exchange material selected from the group consisting of nuclear methylated styrene and divinylbenzene; chlorostyrene and divinylbenzene; styrene, ethylvinylbenzene and divinylbenzene.

3. A method according to claim 1 wherein said pre-treatment is effected with a sulfonated polystyrene copolymer cation exchange resin in the sodium form.

4. A method according to claim 3 wherein said carboxylic acid cation exchange material is selected from the group consisting of cross-linked copolymers of acrylic and methacrylic acids with divinylbenzene and condensation products of aromatic carboxylic compounds and formaldehyde and condensation products of paraffinic carboxylic compounds and formaldehyde.

5. A method according to claim 3 wherein said regenerating agent is a chelating agent selected from the group consisting of sodium salts of citric acid, alanine-N, N-diacetic acid; 2-aminobenzoic acid, N,N'-diacetic acid; -aminoethylphosphonic acid, N,N-diacetic acid; -aminoethylsulfonic acid, N,N-diacetic acid; ammoniatriacetic acid; anilinediacetic acid; 2-sulfoanilinediacetic acid; 1,4-diaminocyclohexane-N,N'-tetraacetic acid; ethylenediamine tetraacetic acid; methylamine-N,N-diacetic acid; trimethylenediamine tetraacetic acid; tetramethylenediamine tetraacetic acid; pentamethylenediamine tetraacetic acid; gluconic acid; malic acid and pyruvic acid.

6. A method of softening hard water containing at least 100 p.p.m. sodium and at least 30 p.p.m. hardness, said hard water contains a bicarbonate concentration at least equal to the hardness content, comprising the following steps:
 (a) pre-treating said hard water with a strong acid cation exchange material to reduce the hardness content to less than 30 p.p.m.;
 (b) passing said partially softened water through carboxylic acid cation exchange material to completely remove hardness therefrom; and
 (c) periodically contacting said carboxylic acid cation exchange material with a regenerating agent selected from the group consisting of organic acids.

7. A method according to claim 6 wherein said regenerating agent is an acid selected from the group consisting of nitric, hydrochloric and sulfuric.

References Cited
UNITED STATES PATENTS 2,676,922  4/1954  Waisbrot _____ 210—38 X

FOREIGN PATENTS 595,314  3/1960  Canada.

SAMIH N. ZAHARNA, *Primary Examiner.*